March 15, 1960  E. A. TAYLOR, JR  2,928,927
CONTROL CIRCUIT FOR HEATING DEVICE
Filed Feb. 10, 1958  2 Sheets-Sheet 1

INVENTOR.
ERNEST A. TAYLOR JR.
BY Ray P. Wymbs
G. Russell Foster
ATTORNEYS

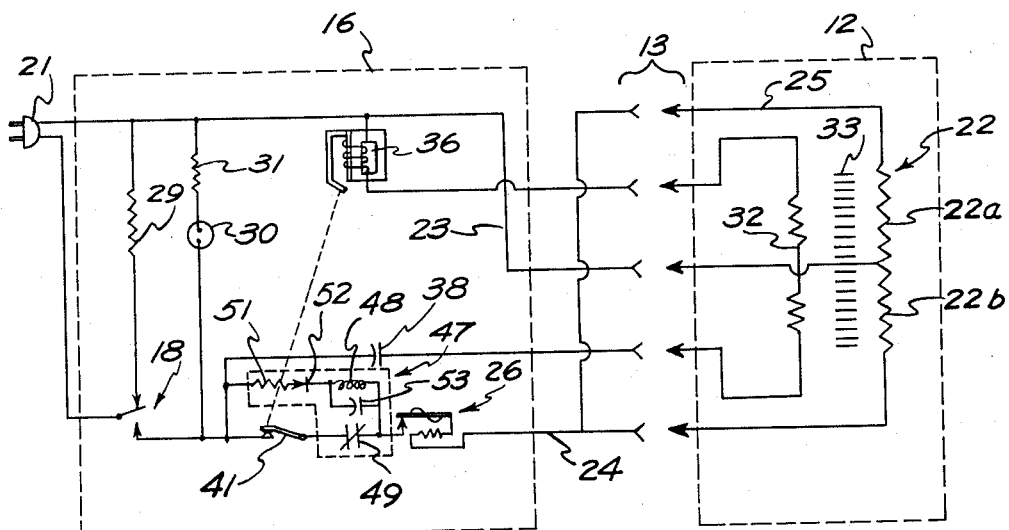

United States Patent Office 2,928,927
Patented Mar. 15, 1960

2,928,927

CONTROL CIRCUIT FOR HEATING DEVICE

Ernest A. Taylor, Jr., Decatur, Ala., assignor to The Chemstrand Corporation, Decatur, Ala., a corporation of Delaware Application February 10, 1958, Serial No. 714,336

4 Claims. (Cl. 219—20)

This invention relates to an improvement in a control circuit for an electric heating device and more particularly to an improved abnormal temperature circuit arrangement for the contol circuit of flexible heating devices such as electric blankets, heating pads, and the like.

As is well known, in the design of control devices for domestic heating devices such as electric blankets and the like, it has been found that not only must comfort and temperature control be provided for temperature regulation during normal operation of the blanket, but in addition, provisions must be made for deactivating the blanket in the event of an excessive or abnormal temperature within the flexible blanket body. Such excessive temperatures may occur from a malfunctioning of the main control circuit or from a doubling back or folding of the flexible blanket body on itself in such a manner that the heat developed in the blanket is trapped within the folds. The maximum permissible rise in blanket temperature under such abnormal condition and the length of time during which the blanket is subjected to such abnormal temperature must, of course, be determined by many design factors such as the particular material from which the blanket is fabricated. The control of such abnormal temperature becomes even more critical where the blanket body is manufactured from synthetic material such as acrylic fibers which are generally sensitive to the prolonged application of heat at the relatively high temperatures.

One construction for limiting temperature rise in the blanket body has been to provide a plurality of small protective devices such as thermostats throughout the blanket body which de-energize the blanket heating means upon a localized rise in blanket temperature. Such an arrangement has not proven entirely satisfactory due to the cost of such devices, the additional weight and bulkiness added to the blanket body thereby, their susceptibility to damage, and the limitation they impose on blanket washing. In another construction which has proven more satisfactory commercially, a feeler or sensing element is located in close spaced-apart relationship with the blanket heating wires or elements and is separated therefrom by a temperature-impedance, control layer of material such as nylon or the like positioned in coextensive, intimate contact with both the feeler and heating elements. The impedance of this control layer of material varies in response to the temperature within the blanket body. This variation may be used as a signal to control the operation of suitable switching devices within main control circuit.

However, this impedance type of abnormal temperature control has not proven entirely satisfactory due to the effect of ambient humidity on the control layer of material, the effect of which is to alter the impedance characteristics of the material over a wide range in accordance with the particular humidity conditions encountered. This effect is particularly noticeable when the variation of the dielectric constant of the material is used as the signal for controlling the circuit switching devices. Thus, in a dry climate where the relative humidity approaches zero, the dielectric constant of nylon is virtually unaffected, whereas, when the relative humidity approaches 100%, the dielectric constant is increased by an amount equivalent to a capacity of approximately 0.0275 to .0325 microfarad. This, of course, means that accurate abnormal temperature control within close limits under all operating conditions is practically impossible.

Accordingly, a primary object of this invention is to provide a new and novel control circuit for electrical heating devices.

Another object of this invention is to provide a new and novel abnormal temperature control arrangement for an electric heating device such as an electric blanket which limits both the duration and magnitude of the abnormal temperature in the blanket body under all conditions of operation.

A further object of this invention is to provide a new and improved abnormal temperature control circuit for an electric heating device which is parttticularly useful for controlling the operation of electric heating blankets having a blanket body composed of heat sensitive synthetic material such as acrylic fibers.

A still further object of this invention is to provide a new and novel abnormal temperature control arrangement for an electric blanket which automatically resumes operation after a voltage outage or dip.

Still another object of this invention is to provide a new and novel control circuit for an electric heating device such as an electric blanket which operates in the desired manner under any conditions of humidity, is inexpensive and simple in construction, and which is relatively compact so as to permit miniaturization and ease of operation while permitting the blanket and associated control to be manufactured with a pleasing outward appearance.

This invention further contemplates the provision of a new and improved control circuit for an electric blanket which utilizes a temperature-impedance control device in the flexible blanket body to accurately detect the presence of an abnormal temperature regardless of humidity conditions, which limits both the duration and magnitude of such an abnormal temperature, which operates in a positive and foolproof manner to deactivate the blanket heating elements until the cause of such abnormal temperature has been removed, and which may be easily reset when the fault is removed.

Other objects and advantages of the invention will become apparent from the following description taken in connection with the accompanying drawings.

In general, the objects of this invention are accomplished by providing an electric control circuit for a heating device such as an electric heating blanket, warming pad, or the like, which incorporates the novel circuit of the invention. The electric blanket is provided with heating means which may be operatively connected to a suitable source of power by means of the control circuit. Means have been provided which is responsive to an abnormal temperature rise in the blanket body for actuating an abnormal temperature relay and de-energizing the blanket heating means. When the abnormal temperature relay means is actuated to de-energize the blanket heating means, a normally inoperative secondary relay means is activated to further interrupt the circuit to the heating means so that upon cooling of the blanket and reclosing of the abnormal temperature relay means, reenergization of the heating means is prevented by the activated secondary relay means. Means have also been provided to deactivate the secondary relay means and restore the control circuit to normal operation.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Figure 3 is a schematic wiring diagram of a modification of the invention; and

Figure 4 is a second modification of the schematic wiring diagram of the invention.

Figure 1:
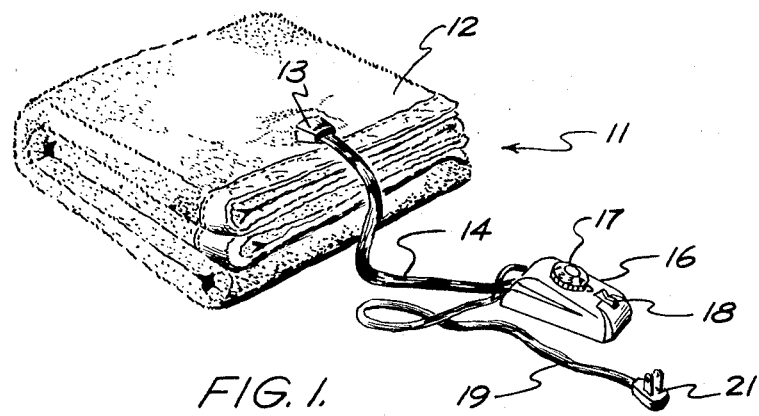
Figure 1 is a perspective view of an electric blanket which incorporates the improved control circuit of the invention.

As generally illustrative of the practice of the invention there is shown in Figure 1 an electrical heating device designated generally by the numeral 11 which incorporates the invention and which, in the specific embodiment, is a flexible electric heating blanket of the type readily available commercially and commonly used domestically. It should be understood, however, that although the invention is primarily concerned with an electric blanket of the type illustrated, it may be readily adapted for use with any similar type of electric heating device such as a heating pad or the like.

As is well known, the blanket 11 includes a body 12 which is generally composed of a fibrous material such as cotton, wool, artificial or synthetic material such as acrylic fibers or the like or any desired mixture thereof. In the specific embodiment, the blanket body 12 is formed from a heat sensitive synthetic material such as acrylic fibers which is prone to discolor or otherwise deteriorate from a prolonged application of heat at a relatively high temperature.

In order to operate the blanket 11, the blanket body 12 is provided with an electrical connector 13 suitably positioned thereon and electrically connected by means of a flexible electrical conductor 14 to a control housing 16 which is preferably manually operable at the convenience of the user.

As is well known, the control housing 16, which contains a temperature regulating device including a dial 17 and a manually operated "off-on" switch 18, is arranged to be connected to a suitable source of electrical power (not shown) by means of a flexible electrical lead 19 terminating in a pronged plug 21.

Figure 2:
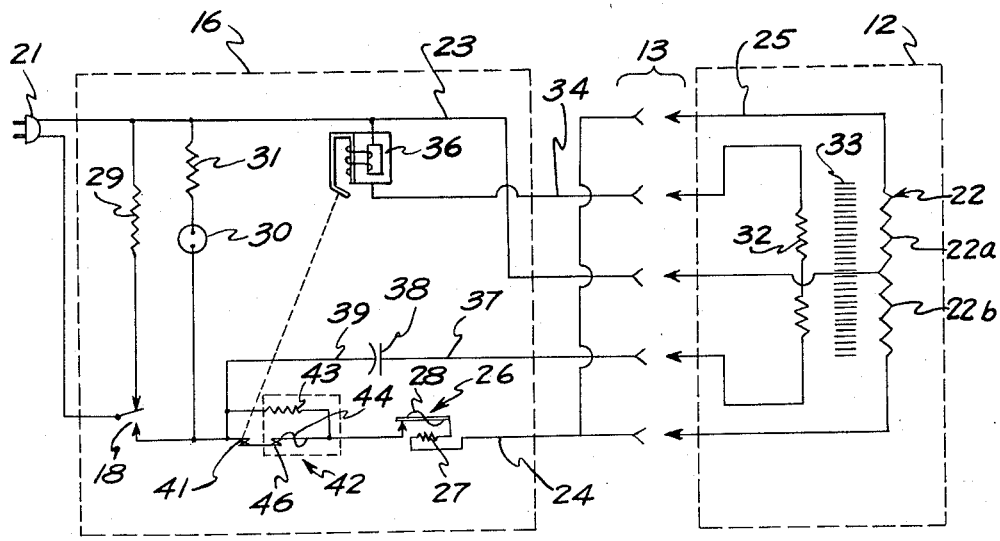
Figure 2 is a schematic wiring diagram of one embodiment of a control circuit constructed in accordance with the invention including the electrical operating components of the blanket.

Referring now to Figure 2, there is shown a schematic wiring diagram of the control circuit for the blanket 11 with its associated components and the novel improvement of the invention. In Figure 2, the blanket body 12 and control housing 16 are diagrammatically represented by dotted lines as indicated. In order to supply heat to the blanket 11, the flexible blanket body 12 contains heating means such as an elongated heating element or wire, designated generally by the numeral 22, which is distributed in a substantially uniform manner throughout the area of the blanket in the well known manner. In the specific embodiment, heating element 22 is formed of two substantially identical heating sections, 22a, 22b, connected in electrical parallel relationship and arranged to be suitably energized by means of lead wires 23—25 as shown partially positioned with the conductor 14. The wires 23—25 are arranged to be interrupted by means of the two-piece connector 13 so as to separate the conductor 14 and the control housing 16 from the blanket body 12. As is well known, the electrical conductors 23, 24 terminate in the plug 21 as indicated in Figure 2 which may be inserted within a common household receptacle or the like when the blanket is to be operated.

In order to control the operation of the heating element 22, and consequently the temperature of the blanket body 12, a comfort temperature sensitive device is provided which is preferably a bimetallic thermostat designated generally by the numeral 26. The thermostat 26 to which conductor 24 is electrically connected includes a serially connected heater 27 and a flexible bimetallic strip 28 arranged in heat exchange relationship with the heater. The operating temperature of the blanket 11 may be predetermined by means of the manually operable selector dial 17 so that the bimetallic strip 28 cycles between the open and closed position as a result of the current flowing through heater 27 to periodically interrupt the circuit through conductor 24 and determine the temperature at which the blanket body 12 is maintained.

In order to connect the blanket heating element 22 with the source of power when plug 21 is appropriately inserted with an associated receptacle, the manual switch 18, which is shown in the "off" position in Figure 2, may be moved to the "on" position so that current will flow through the leads 23—25 into the wires of heater 22. When switch 18 is in the "off" position shown, a pre-heat resistor 29, which is preferably provided for heating the interior of the control housing 16, is energized, and the components located within the control housing are maintained at a temperature similar to the temperature produced when the blanket is operating. Furthermore, a signal device such as a neon lamp 30 together with a current limiting resistor 31 is also preferably connected between the power conductors 23, 24, so that when the blanket is operating a signal light in housing 16 is produced by the lamp.

As should be understood, during the operation of an electric heating blanket of the type illustrated, the temperature of the blanket or portions of the blanket may rise to an abnormal level due to such factors as malfunctioning of the circuit, inadvertent bulking or folding over of blanket portions, or the like, so that the heat developed by the blanket is trapped and allowed to develop to an excessive extent. As such abnormal temperature conditions are not only dangerous, but also deleterious to the blanket components or blanket material, overload or abnormal temperature protective devices must be provided in order to limit the temperature rise within the blanket to a safe level. Many types of such thermostatic protective devices have been proposed, and in the specific embodiment, the blanket is provided with a control impedance device which is responsive to blanket temperature and which is used to control the operation of the heater 22 within safe operating temperature limits.

More specifically, the blanket body 12 contains a feeler or sensing element 32 such as a wire or the like which is distributed throughout the portions of the blanket body 12 in close, spaced-apart relationship with the heater wire 22. This sensing element 32 is maintained in such spaced-apart relationship by means of a control layer of material such as nylon or the like in coextensive intimate contact with the sensing and heating elements 32, 22 throughout. As is well known, the dielectric constant of the nylon control layer rises proportionally with temperature, increasing the capacitance between the sensing and heating elements, and this characteristic is employed to de-energize the heating element 22 at a predetermined capacitance level corresponding to the attainment of a corresponding abnormal temperature in the blanket body 12.

One side of the sensing element 32 is electrically connected by means of lead wire 34 to one side of a "ferro-resonant" relay 36, the other side of which is connected electrically to the main heating element conductor 23. The other side of the sensing element 32 is connected by means of a conductor 37 to a capacitor 38 which in turn is connected by means of a conductor 39 to conductor 24 as shown in Figure 2.

The relay 36 is provided with a pair of normally open contacts 41 which are controlled thereby in the conventional manner and which are connected serially with the lead wire 24 as shown so as to control the operation of the heating element 22. As is well understood, the capacitor 37 is of a selected capacity so that at a specific flux density the relay coil and capacitor go into "ferroresonance" to operate the relay.

As is well known, in such abnormal temperature relay devices, an effective capacitance is developed in the circuit between the heating element 22 and the sensing element 32 which varies in direct proportion to the temperature of the blanket body 12. As previously explained, this capacitance is determined by the dielectric constant of the nylon control layer 33 which is responsive to the heat of the blanket body 12.

This effective capacitance between elements 22, 32 which is in parallel with the capacitor 38, is sufficiently low under normal conditions so that when the circuit is energized by the closing of switch 18, relay 36 is actuated to close its contacts 41 and permit energization of the heating element 22 through the conductors 23—25. During the normal operation of the blanket 11, the comfort thermostat 26 cycles between the "on" and "off" position to maintain the blanket body 12 at the predetermined temperature according to the setting of dial 17.

When an abnormal temperature occurs in the blanket body 12, the temperature rise in the body increases the dielectric constant or effective capacitance of the nylon control layer 33 so that the control impedance is decreased. Insufficient voltage is applied to relay 36 and it drops out opening contacts 41 and de-energizing the heating element 22.

Although this control system works satisfactorily under most operating conditions, the factor of humidity is an important consideration in calibrating and operating such a control system efficiently. As is well known, nylon and similar materials have some affinity for moisture and under conditions of high relative humidity, absorb sufficient moisture to add considerably to their dielectric constant. For instance, it has been found through experimentation with the above-described blanket that nylon in an ambient of approximately 100% relative humidity increases its dielectric constant to the equivalent of a temperature change of approximately 125 to 135° over the dielectric constant existing at an ambient of approximately zero relative humidity.

As can be understood, therefore, since the ambient conditions may easily vary throughout the full range of humidity according to the specific geographical location or climatic condition in which the blanket is used, many operating problems will be encountered. For instance, it is possible that the blanket will fail to operate under low line voltage conditions as a result of the increased dielectric constant of the nylon control layer due to humidity. If the blanket is designed to operate at high humidity and low voltage conditions, the subsequent drying out of the nylon control layer at an abnormal temperature condition would raise the maximum abnormal temperature cut-off to a much higher level at which it would cycle continuously. As previously explained, when heat sensitive materials such as acrylic fibers are used in such blankets, this combination of high temperature and prolonged periods of heat application would cause undesirable deterioration of the blanket such as discoloration or the like.

Means, therefore, have been provided for limiting the temperature to which the blanket body 12 may rise and for reducing to an absolute minimum the time at which this abnormal temperature is maintained. More specifically, secondary relay means has been provided which is designated generally by the numeral 42 and which is shown schematically within the dotted lines in Figure 2.

As specifically illustrative of the invention, the secondary relay means 42 contains a heating resistor 43 which is connected in electrical parallel relationship with the abnormal temperature relay contacts 41 with each side of the heater 43 suitably connected as shown to conductor 24. The heater 43 is positioned in heat exchange relationship with a heat responsive device such as a bimetallic strip 44 arranged to operate a pair of contacts 46 serially connected with the relay contacts 41. The heater 43 is designed to attain its operating temperature when it passes a current much smaller than the current that normally is required by heater 22.

As shown in Figure 2, the contacts 46 are maintained in a closed position during the normal operation of the blanket 11 as the heater 43 is effectively shunted out of the circuit. During the normal operation of the blanket, the contacts 46 of the secondary relay 42 are maintained in the closed position along with the abnormal temperature relay contacts 41 in the manner explained above.

When the blanket is not operating properly due to a condition such as a folding or doubling back of the blanket body on itself, a temperature rise is created in the body and the dielectric constant of the nylon control layer 33 increases proportionally so that an effective capacitance is added to the circuit in parallel with capacitor 38. When this effective capacitance has increased to a predetermined level in response to the abnormal temperature created in the blanket body 12, insufficient voltage is applied to the coil of relay 36 permitting contacts 41 to open. As previously explained, this relay drop-out voltage, of course, may be preset by selecting the relative sizes of the relay coil and capacitor 38.

As can be seen in Figure 2, a small amount of current will now flow through the secondary relay heater 43 and heater 22 so that the bimetallic strip 44 is heated and the contacts 46 open as a result of the flexing of the strip. At this time, lead wire 24 is opened at two points, namely, contacts 41, 46, and the heater 22 is substantially de-energized, except for the small current required by the secondary relay heater 43.

As will be understood, the substantially complete deenergization of the heater 22 results in a considerable cooling in the blanket body 12 so that the relay 36 will eventually operate to close its main contacts 41 in an attempt to complete the full circuit once again through lead wire 24 to the main heater 22. However, as contacts 46 are now open, full energization of the main heater 22 through conductor 24 is not possible, and the blanket will fail to heat.

With this circuit arrangement, as soon as the blanket body 12 attains the predetermined abnormal temperature, the blanket heating circuit becomes virtually inoperative and the blanket cools down. Since the secondary relay heater 43 requires but a fraction of the current required by heater 22, and since the heating effect varies as the square of the current in a heater, the blanket body 12 will remain at the elevated abnormal temperature for only a short period of time. Thus, when synthetic fibers which are extremely sensitive to prolonged heat are employed in the blanket 12, deterioration of the blanket material is avoided in that the elevated temperatures attendant with abnormal operating conditions do not exist in the blanket for any appreciable length of time.

In order to restore the blanket to normal operating conditions after the abnormal conditions, such as a folded blanket, has been eliminated, the manual operating switch 18 must be moved to the open position shown in Figure 2 so as to deactivate the secondary relay means 42 and permit the bimetallic strip 44 to cool and close contacts 46. It should be understood, however, that unless the faulty condition or improper folding of the blanket has been eliminated, the above-described blanket cut-out operation will repeat itself after the switch 18 is reclosed, and the blanket will once again become inoperative. However, when the manual switch 18 deactivates the relay 42 and the faulty condition has been removed, the switch may be once again moved to the "on" position so that normal operation of the blanket may be obtained.

The novel arrangement of the invention lends itself to many modifications and one such modification is shown in Figure 3 where like numerals have been employed to identify like parts. In the embodiment of Figure 3, the secondary relay means is designated generally by the numeral 47 and is shown within the dotted lines. The relay means 47 is of the time delay type having a coil 48, a set of normally closed contacts 49, a resistor 51, a rectifier 52, the latter two of which are serially connected with the coil 48 and a capacitor 53 connected in parallel with the coil 48 as shown. The relay components, with the exception of the contacts 49, are connected in electrical parallel relationship with the abnormal temperature relay contacts 41 and the contacts 49 are serially connected with the contacts 41 in a manner similar to the circuit of Figure 2.

In the operation of the embodiment of Figure 3, the opening of the relay contacts 41 by the actuation of the abnormal temperature relay 36 in the above-discussed manner, activates the secondary relay 47 to open the contacts 49 and interrupt the circuit through lead wire 24 at a second location. The secondary relay 47 may be of any conventional time delay type which contains a current limiting resistor 51, the value of which may be selected to predetermine the charging time of the condenser 53 and thus the opening of contacts 49 by means of the coil 48. The time constant built into the relay 47 is necessary in order to prevent the operation of the secondary relay prior to the normal energization of the heater 22 through the relay contacts 41. With the embodiment of Figure 3, therefore, the maintaining of an abnormal temperature in the blanket body 12 for any length of time is eliminated as in the embodiment of Figure 2 and by opening and closing the manual switch 18 together with removal of the faulty condition the blanket is restored to normal operation.

Figure 4 shows a further modification of the invention in that secondary relay means, designated generally by the numeral 54, is provided which comprises a glow tube device such as is commonly found in fluorescent lamp starters. The glow tube 54 is activated when the abnormal temperature relay contacts 41 are opened in a manner similar to the embodiments of Figures 2, 3. When the glow tube 54 is activated, electron flow from the filament 56 to a flexible strip 57 will heat strip 57 which upon flexing, opens a pair of associated contacts 58 to interrupt the lead wire 24. Normal operating conditions in the blanket may once again be obtained upon removal of the faulty condition by moving the switch 18 to the "off" position and back to the "on" position whereupon reclosing of the contacts 41 and 58 results.

By means of the novel construction of this invention, electric blankets may now be constructed of heat sensitive, synthetic fibers which are not subjected to abnormal temperatures for any appreciable length of time. This means that a source of the deterioration (discoloration in particular) in such synthetic blanket material has been completely eliminated and full advantage may be taken of the outstanding characteristics of such synthetic fibers for blanket material. As synthetic material is also used in the control impedance layer between the sensing and heating elements in many control systems employed today, the heretofore problem of circuit calibration for proper blanket operation under all conditions of humidity is no longer of any concern as the novel circuit of the invention operates satisfactorily under all humidity conditions. Furthermore, the improvement of this invention is positively acting and is commercially inexpensive. In addition, the blanket control circuit continues to operate through voltage dips and voltage outages, and will even operate at unusually low line voltages adding considerably to its commercial advantage where used domestically.

While there has been described what at present is considered to be the preferred embodiment of the invention, it will be understood by those skilled in the art that various changes and modifications may be made therein without departing from the invention, and, therefore, it is the aim of the appended claims to cover all such changes and modifications as fall within the true spirit and scope of the invention.

Having thus described the invention, what is claimed is:

1. A control circuit for a heating device comprising, in combination, means for heating said heating device, means for energizing said heating means, means for controlling the energization of said heating means including abnormal temperature relay means, said abnormal temperature relay means being provided with a pair of contacts for controlling the energization of said heating means, means responsive to the temperature of said heating device for actuating said abnormal temperature relay means to de-energize said heating means when said heating device attains a predetermined abnormal temperature, normally inoperative secondary relay means including a secondary circuit in electrical parallel relationship with said pair of relay contacts, said secondary circuit being normally electrically shunted when said pair of relay contacts are in the closed position, means for activating said secondary relay means when said heating means is de-energized by said abnormal temperature relay means, said activated secondary relay means being arranged to shunt said abnormal temperature relay means and maintain said heating means in a substantially de-energized condition, said secondary circuit including a time delay relay having a pair of normally closed contacts, said normally closed contacts being arranged serially with said pair of relay contacts and said heating means, means for activating said time delay relay when said abnormal temperature relay contacts are opened to open said normally closed contacts to maintain said heating means in a substantially de-energized condition and means for deactivating said secondary relay means.

2. A control circuit in accordance with claim 1 wherein said means for deactivating said secondary relay means include a manually operable switch means being arranged to deactivate said secondary relay in a first switch position and being arranged to energize said heating means in a second switch position.

3. A control circuit for a heating device comprising, in combination, means for heating said heating device, means for energizing said heating means, means for controlling the energization of said heating means including abnormal temperature relay means, said abnormal temperature relay means being provided with a pair of contacts for controlling the energization of said heating means, means responsive to the temperature of said heating device for actuating said abnormal temperature relay means to de-energize said heating means when said heating device attains a predetermined abnormal temperature, normally inoperative secondary relay means including a secondary circuit in electrical parallel relationship with said pair of relay contacts, said secondary circuit being normally electrically shunted when said pair of relay contacts are in the closed position, means for activating said secondary relay means when said heating means is de-energized by said abnormal temperature relay means, said activated secondary relay means being arranged to shunt said abnormal temperature relay means and maintain said heating means in a substantially de-energized condition, said secondary circuit including a glow discharge device having a pair of normally closed contacts serially connected with said relay contacts and said heating means, means for activating said glow discharge device when said abnormal temperature relay contacts are opened to open said discharge device contacts and maintain said heating means in a substantially de-energized condition and means for deactivating said secondary relay means.

4. A control circuit in accordance with claim 3 wherein said means for deactivating said secondary relay means include a manually operable switch means being arranged to deactivate said secondary relay in a first switch position and being arranged to energize said heating means in a second switch position.

References Cited in the file of this patent

UNITED STATES PATENTS

| | | |
|---|---|---|
| 2,592,525 | Huck | Apr. 15, 1952 |
| 2,636,959 | Huck | Apr. 28, 1953 |
| 2,768,274 | Estes | Oct. 23, 1956 |
| 2,777,932 | Barr et al. | Jan. 15, 1957 |
| 2,784,288 | Moran et al. | Mar. 5, 1957 |
| 2,801,317 | Goldmuntz et al. | July 30, 1957 |